Sept. 17, 1968  J. F. BLUMENFIELD ET AL  3,402,249
LIQUID COOLING DEVICE FOR GLASS FURNACE ELECTRODE
Filed Jan. 20, 1967  2 Sheets-Sheet 1

INVENTORS
JOHN F. BLUMENFELD
JOHN T. MERDIAN
BY McCormick, Paulding & Huber
ATTORNEYS Sept. 17, 1968  J. F. BLUMENFIELD ET AL  3,402,249
LIQUID COOLING DEVICE FOR GLASS FURNACE ELECTRODE
Filed Jan. 20, 1967  2 Sheets-Sheet 2

United States Patent Office 3,402,249
Patented Sept. 17, 1968

3,402,249
LIQUID COOLING DEVICE FOR GLASS
FURNACE ELECTRODE
John F. Blumenfeld, Simsbury, Conn., and John T. Merdian, Pittsburgh, Pa., assignors to Emhart Corporation, Bloomfield, Conn., a corporation of Connecticut
Filed Jan. 20, 1967, Ser. No. 610,593
3 Claims. (Cl. 13—6)

ABSTRACT OF THE DISCLOSURE

A housing defining a chamber for circulating a liquid coolant and which is clamped in engagement with a surface area on a glass electrode.

BACKGROUND OF THE INVENTION

In some glass making furnaces, the batch material is heated by the "Joule effect" of passing electric current between partially submerged electrodes, and in still other furnaces electric heating is used as a booster or assist for other furnace heating means. The electrodes which are commonly used are made of molybdenum or graphite, and while these electrodes have the desired electrical characteristics, they have the undesirable characteristic of being subject to rapid deterioration by exposure to air while at a high temperature. This has been an acute problem for the designers of electric melting glass making furnaces, because that portion of the electrodes which is not submerged but which is exposed to air is at a very high temperature due to the proximity of the molent glass.

One step taken to overcome the problem of deterioration has been to provide the electrodes with a protective coating, but this is only partially effective at best. That is, the coating material cannot be applied over the entire electrode because at least a portion of it must be bared for efficient electrical connection with a power supply, and the best known coatings are not wholly impervious to air entry. Therefore, in addition to providing a protective coating, devices have been suggested and tried for cooling the electrodes.

Some such cooling devices employing water or another liquid coolant have comprised jackets which surround the electrodes rather loosely and are thus not very efficient. Other liquid coolant devices have circulated the coolant in direct contact with the electrodes or through passages provided therein, but sealing, drainage, and circulation problems have been encountered with these devices.

SUMMARY OF THE INVENTION

It is the general object of the present invention to provide a liquid cooling device for a glass furnace electrode which comprises a coolant housing adapted to be brought into firm and intimate engagement with the electrode for efficient cooling thereof and which avoids the disadvantages of those cooling devices wherein the liquid is brought into direct contact with the electrode.

In keeping with this general object, the cooling device of this invention is provided in the form of a housing defining a closed chamber for circulating a liquid coolant, and it is provided with inlet passage means and discharge passage means at opposite ends of the chamber for introducing and removing the coolant therefrom. This housing is adapted to be clamped to an electrode so that one wall of the housing directly engages a surface area thereof to provide the cooling effect. An appendage is provided on the housing to project into spaced relationship with a second surface area on the housing which is generally opposite that of the first surface area, and a thumb screw is provided to operate between the said second surface area and the appendage to draw the housing into tight engagement with the first surface area. It is believed that by this direct contact with one surface area, efficient cooling of the electrode will be achieved despite the fact that the second surface area is exposed. This efficient cooling will be achieved because the electrode material is a good heat conductor and thus will assist in the dissipation of heat through only one surface area.

It will be understood that the shape and design of the cooling housing will vary with the shape and design of the electrode. The electrode is generally provided in the shape of a flat bar of rectangular cross section or as a cylindrical bar. Thus, in the accompanying drawings a preferred embodiment is shown for flat bar electrodes and a preferred embodiment is shown for cylindrical bar electrodes.

DETAILED DESCRIPTION OF THE PREFERRED EMBODIMENTS

Figure 1:
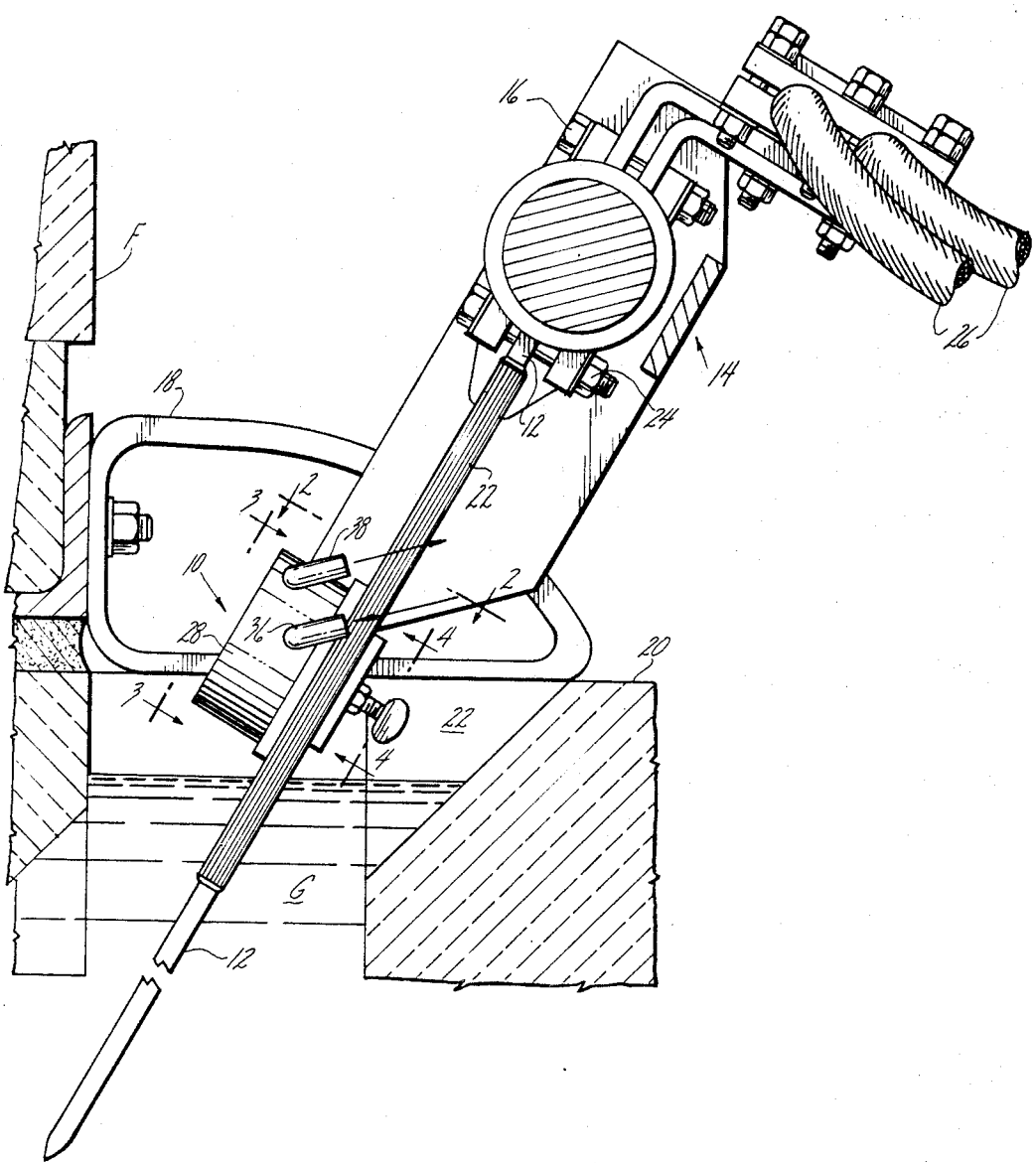
FIG. 1 is a vertical sectional view taken through an electrode holder mounted on a glass making furnace and showing a side elevational view of the cooling device of this invention mounted upon a flat bar electrode secured in such holder.

For the purposes of illustration, the cooling device 10 of this invention has been shown in FIG. 1 associated with a flat bar electrode 12 which is supported by an electrode holder 14 of the type shown in the co-pending application of Blumenfeld and Hanks entitled Electrode Holder for Glass Furnaces or the Like, Ser. No. 599,088, filed Dec. 5, 1966. As further described in that application, the electrode holder 14 includes a frame 16 which is movably supported on a pair of brackets, one of the brackets being shown at 18. The brackets 18 are supported on top of a lateral bay 20 extending from the side wall of a glass making or melting furnace F, the said brackets being secured to the said side wall to straddle an opening 22 in the bay exposing the top surface of the glass G within the furnace and bay. The holder is thus mounted to project the lower end portion of the electrode 12 into the molten material in the bay, and the angle of inclination of the electrode relative to the molten material can be adjusted by movement of the frame 16 over the brackets 18.

It will be seen that only the lower portion of the electrode 12 is submerged in the molten material, and it will also be seen that a substantial portion of the exposed part of the electrode is covered with a protective coating 22. However, the electrode 12 is bare above the said coating where it is engaged and secured by clamp means 24, forming a part of the holder 14 and effecting electrical connection between the said electrode and conductors 26, 26 extending to a suitable electric power supply.

Figure 2:
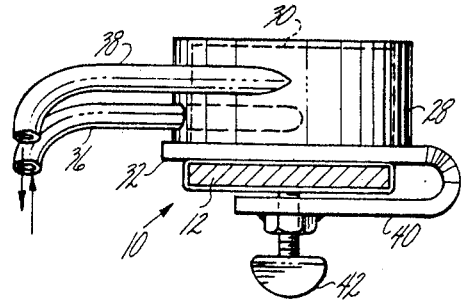
FIG. 2 is a sectional view through the electrode taken as indicated by the line 2—2 of FIG. 1, thus providing a plan view of the cooling device.
Figure 3:
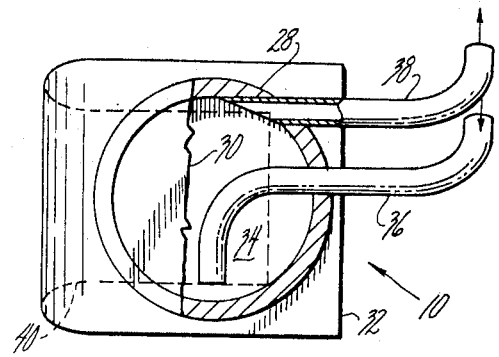
FIG. 3 is a view of the cooling device taken as indicated by the line 3—3 of FIG. 1 with a wall of the housing broken away to show the inlet and discharge passage means associated therewith.
Figure 4:
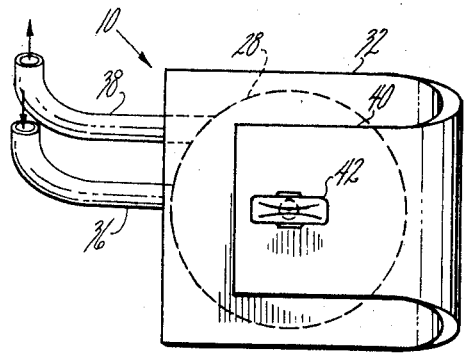
FIG. 4 is an elevational view of the cooling device taken as indicated by the line 4—4 of FIG. 1.

As best seen in FIGS. 2, 3 and 4, the cooling device 10 comprises a housing having a cylindrical side wall 28 which is closed by an outer end wall 30 and an inner end wall 32, the said walls preferably being joined in a welded connection to define a closed cylindrical coolant circulating chamber 34. Inlet passage means for introducing the coolant liquid to the chamber 34 is provided by a conduit 36 extending almost radially into the chamber through its side wall 28 and then bending downwardly within the chamber so that the coolant liquid is introduced to the chamber 34 near the bottom end thereof with the cooling device 10 secured to the electrode 12 as shown in FIG. 1. A discharge passage means for the chamber 34 is provided by a conduit 38 which extends nearly tangentially into the chamber through the side wall 28 at the upper end of the said chamber as viewed with the device 10 secured to the electrode as shown in FIG. 1. Thus, a liquid coolant, such as water, in introduced to the coolant chamber 34 at the lower end thereof, which is the end closest to the molten glass and in the region of highest temperature, and the coolant then circulates upwardly in the coolant chamber for discharge. Each of the conduits 36 and 38 is connectible, preferably by a flexible metal connector, to a source of coolant supply under pressure and/or to a drain to assure circulation of the coolant.

It will be seen in FIGS. 1 and 2 that the housing of the cooling device 10 is secured to the electrode 12 so that the end wall 32 of the said housing firmly engages a first surface area of the electrode 12 near the surface of the molten glass G and on one of the major flat sides of the electrode. This mounting of the coolant housing on the electrode is achieved by providing an appendage 40 on the said housing and which is bent substantially parallel to the end wall 32 to project over a second surface area on the electrode 12 which is opposite that first surface area engaged by the end wall 32. A thumb screw 42 is threaded into the appendage 40 to act between it and the electrode to draw the housing into engagement with the first surface area, the said thumb screw bearing against the second surface area of the electrode. Preferably, the appendage 40 is formed integrally with the housing as a part of the end wall 32, but the appendage can be otherwise formed or secured to the housing.

Figure 5:
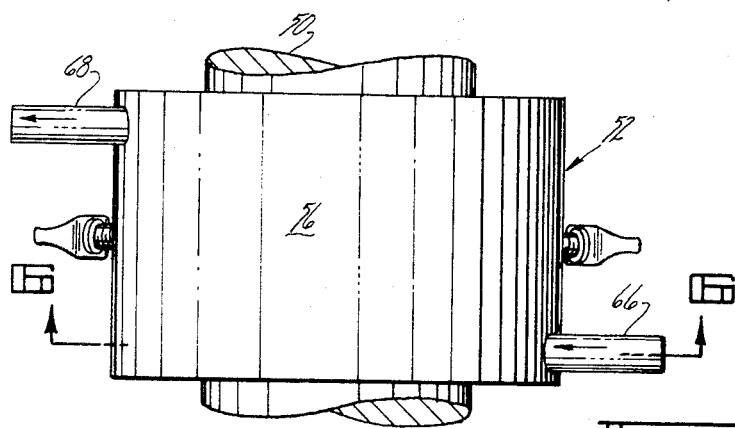
FIG. 5 is an elevational view of the preferred embodiment of the cooling device adapted for use with a cylindrical bar electrode.
Figure 6:
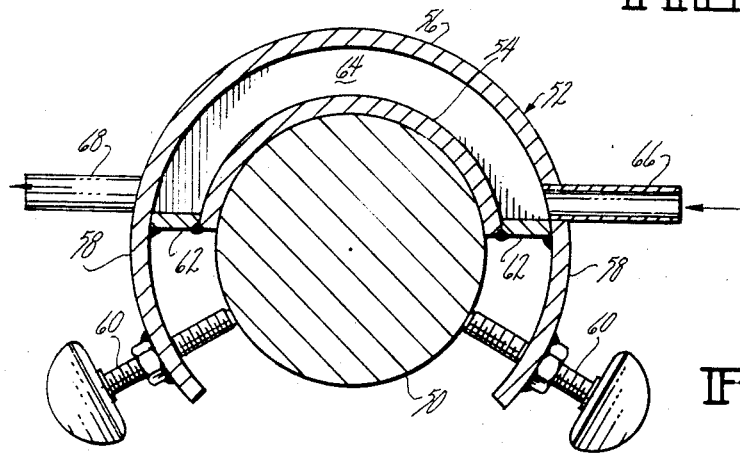
FIG. 6 is a transverse sectional view through the device shown in FIG. 5 and taken as indicated by the line 6—6 of FIG. 5.

The cooling device 10 described in connection with FIGS. 1–4 is, of course, particularly adapted for use with a flat bar electrode wherein the housing is drawn into firm engagement with one major surface of the electrode and supported in position by the thumb screw engaging the opposite major surface of the electrode, and it will be seen that the position of the cooling device can readily be adjusted along the electrode. Obviously, a design change for the cooling device is needed for adaptation to a cylindrical bar electrode, and such modification or design change for the cooling device is shown in FIGS. 5 and 6 wherein the cylindrical bar electrode is designated by the reference number 50 and the cooling device is designated generally by the reference number 52.

As shown in these figures, the cooling device 52 comprises a housing formed in part by an inner parti-cylindrical wall 54 which is shaped to be complementary to the electrode 50 so as to engage and embrace a surface area thereof which does not encompass more than one-half of its circumference and preferably less than one-half thereof. The cooling device housing is also formed in part by an outer parti-cylindrical wall 56 which is concentric with the inner wall 54 but which has extensions or appendages 58, 58 extending beyond the inner wall 54 so that the outer wall 56 surrounds the electrode 50 for a major part of its circumference. This permits the use of a pair of thumb screws 60, 60 which act between the appendages 58, 58 and a surface area on the electrode 50 which is generally opposite that engaged by the inner wall 54 so as to draw the said inner wall into firm contact in engagement with the first surface area of the electrode. The housing is further defined by a pair of side wall member 62, 62 (FIG. 6) extending between the inner and outer walls 54 and 56 and by a pair of end walls which extend over the ends of the inner and outer walls and are welded thereto. Thus, a parti-cylindrical coolant circulating chamber 64 is defined within the housing portion of the cooling device 52.

As in the first described embodiment, inlet and discharge passage means are provided for the coolant chamber 64, the inlet passage means comprising a conduit 66 opening into the bottom end of the chamber near one edge of the inner side wall 54, and the outlet passage means comprises a conduit 68 opening into the upper end of the chamber 64 adjacent the other edge of the inner wall member 54. Thus, when the conduits 66 and 68 are connected by suitable flexible means to a source of coolant under pressure and/or to a drain, the coolant can be circulated through the chamber 64, being introduced near the lower end thereof and being discharged from the upper end thereof. This is the most desired and efficient arrangement in that the lower end of the circulating chamber is closest to the body of molten glass where the temperature is the highest. Efficient cooling is achieved by the device 52 secured as shown in FIGS. 5 and 6 to the electrode 50, it being considered unnecessary to surround the entire electrode with a cooling jacket.

We claim:

1. A device for cooling a bar type electrode having a portion of its length submerged in molten glass in a glass making furnace or the like, said device comprising a housing defining a closed chamber of at least parti-cylindrical shape for the circulation of a liquid coolant and having inlet passage mean for introducing the coolant near one end of the chamber closest to the submerged portion of the electrode and discharge passage means for the coolant near the opposite end of the chamber farthest from the submerged portion of the electrode, one wall of said housing being provided with a shape complementary to a first exposed surface area of the electrode adjacent the molten glass for engagement therewith, an appendage formed integrally with a wall of the housing and projecting from said housing into spaced relationship with a second surface area of the electrode which is generally opposite the first surface area thereof, and manually operable means mounted on said appendage acting between said appendage and second surface area to draw said housing into firm engagement with the first surface area of the electrode and to support the housing in adjusted positions thereon.

2. The electrode cooling device of claim 1 wherein the electrode is of generally rectangular cross section having its lower end submerged, the housing is of substantially cylindrical shape with the inlet and discharge passage means arranged to introduce and remove coolant from the said chamber in generally opposed diametric locations, wherein the said wall is an end wall of said housing, and said appendage is integral with and bent substantially parallel to said wall.

3. The electrode cooling device of claim 1 wherein the electrode is of generally circular cross section with its lower end portion submerged, the first surface area embraces no more than one-half of the circumference of the electrode, a second wall of the housing is spaced from and formed generally concentrically with said wall of the housing, there are a pair of such appendages provided to encompass with said second wall of the housing more than one-half of the circumference of said electrode, and wherein the means acting between said appendage and said second surface area comprises a thumb screw threaded into each such appendage and engaging said second surface area.

References Cited

UNITED STATES PATENTS

| | | | |
|---|---|---|---|
| 836,155 | 11/1906 | Tone | 13—15 |
| 1,539,703 | 5/1925 | Tagliaferri | 13—14 |
| 2,135,761 | 11/1938 | Moore | 13—15 |
| 2,290,031 | 7/1942 | Brooke | 13—15 |

BERNARD A. GILHEANY, *Primary Examiner.*

H. B. GILSON, *Assistant Examiner.*